United States Patent [19]

Fyie et al.

[11] 4,359,151
[45] Nov. 16, 1982

[54] DISTRIBUTION APPARATUS

[75] Inventors: Joseph A. Fyie; Thomas E. Peters, both of Boise, Id.

[73] Assignee: Morrison-Knudsen Forest Products Company, Inc., Boise, Id.

[21] Appl. No.: 201,043

[22] Filed: Oct. 27, 1980

[51] Int. Cl.$^3$ .............................................. B65G 47/19
[52] U.S. Cl. .................................. 198/525; 425/81.1; 425/83.1
[58] Field of Search ................... 425/80.1, 81.1, 83.1; 198/525, 526, 533; 193/14; 241/93

[56] References Cited

U.S. PATENT DOCUMENTS

| | | | |
|---|---|---|---|
| 2,230,880 | 2/1941 | Brown | 425/83.1 |
| 2,879,904 | 3/1939 | Walsh et al. | 198/525 |
| 3,999,650 | 12/1976 | Gerhardt | |
| 4,045,528 | 9/1977 | Urmanov | |
| 4,058,201 | 11/1977 | Etzold | |
| 4,063,858 | 12/1977 | Heinrich et al. | |
| 4,217,078 | 12/1980 | Buell | 425/81.1 |

FOREIGN PATENT DOCUMENTS 390569  4/1933  United Kingdom ................... 193/14

OTHER PUBLICATIONS

Modern Particleboard and Dry-Process Fiberboard Manufacturing by T. M. Maloney, Pub: Miller Freeman.

Primary Examiner—John J. Love
Assistant Examiner—Douglas D. Watts
Attorney, Agent, or Firm—Seed, Berry, Vernon & Baynham

[57] ABSTRACT

The apparatus described is designed to distribute particles of lignocellulosic material falling by gravity uniformly over the inlet area of an electrostatic orientation unit. The particles are metered onto a conveyor belt which discharges an even flow of particles between a pair of contrarotating squirrel-cage rolls whose direction of rotation is such that one part of the flow of particles passes between the rolls and two other parts of the flow are deflected outwardly from the contrarotating rolls. The three portions of the particle flow from the contrarotating rolls are directed respectively to larger squirrel-cage distribution rolls positioned within distribution chambers beneath the contrarotating rolls for even distribution. Various vanes and deflectors are provided to direct the flow of particles within the apparatus.

11 Claims, 6 Drawing Figures

DISTRIBUTION APPARATUS

BACKGROUND OF THE INVENTION

1. Field of the Invention

This invention relates to apparatus and methods for uniformly distributing freely-falling, discrete particles of lignocellulosic material over an area.

2. Prior Art Related to the Disclosure

The invention disclosed below finds particular application with electrostatic orientation systems for mat-forming of wood-based composite panel products, such as waferboard, oriented structural board, or composite plywood. For optimum alignment, the lignocellulosic materials, particularly non-fibrous lignocellulosic particles, should be uniformly distributed over the area of the electrostatic orientation zone. The particles enter the electrostatic orientation zone in a free-fall condition where the strong electric field within the zone influences each particle for a time sufficient to electrically polarize and orient the particles in the direction of the electrostatic field.

Fiber-distribution systems of various kinds for lignocellulosic materials are known. A typical system is disclosed in U.S. Pat. No. 3,999,650, which discloses a plurality of conveyors arranged in an overlapping fashion such that one part of a flow of fibrous material from a first conveyor falls on a distributing brush at the bottom of a chute and the other part of the flow of material falls on a second conveyor. The material on the second conveyor falls partly on a second distributing brush and on a third conveyor. The distributing brushes distribute the material over an area; however, the brushes create air turbulence causing local irregularities in the distribution of the material.

Squirrel-cage rolls have been used in distribution systems merely for breaking clots of material but have not been used for uniformly distributing material for passage through an electrostatic orientation field.

SUMMARY OF THE INVENTION

It is an object of the invention to provide apparatus and a method for uniformly distributing freely-falling lignocellulosic particles over a large area.

It is another object of the invention to provide apparatus using squirrel-cage rolls for lignocellulosic particles distribution over a large area.

It is another object of the invention to provide apparatus adapted for free-fall feeding of lignocellulosic particles to an electrostatic orientation system for mat-forming of composite panel products.

In accordance with these and other objects of the invention, an apparatus and method are provided for uniformly distributing freely-falling lignocellulosic particles over the inlet to an electrostatic orientation system. The apparatus includes means for distributing a controlled flow of particles to a first set of contrarotating squirrel-cage rolls. These rolls are rotatably mounted in a spaced-apart relationship such that one part of the flow passes between the spaced-apart squirrel-cage rolls and a second and third part of the flow are directed outwardly from the rolls so that the flow of particles is divided into three substantially equal flow streams. A second set of squirrel-cage distribution rolls, mounted within a frame beneath the first set, each receive one of the portions of the flow. The flow passes through the second set of squirrel-cage distribution rolls for uniform distribution of the material over the inlet area of the orientation cell beneath the distribution rolls. A plurality of adjustable guide vanes adjust the lateral distribution of the second and third portions of the flow. Other vanes guide the particles as required.

The method of uniformly distributing freely-falling particles over an area includes the steps of delivering portions of a flow of discrete particles to each of a plurality of distribution chambers and evenly distributing each portion with a squirrel-cage distribution roll mounted in the respective distribution chambers. One aspect of the method includes distributing a flow of freely-falling particles to a pair of spaced-apart, contrarotating squirrel-cage top rolls located above the distribution rolls. These rolls divide the flow into a first portion passing between the spaced-apart, contrarotating rolls and into second and third portions deflected by the rolls, with each portion being fed to one of the distribution rolls.

DETAILED DESCRIPTION OF THE PREFERRED EMBODIMENT

Figure 1:
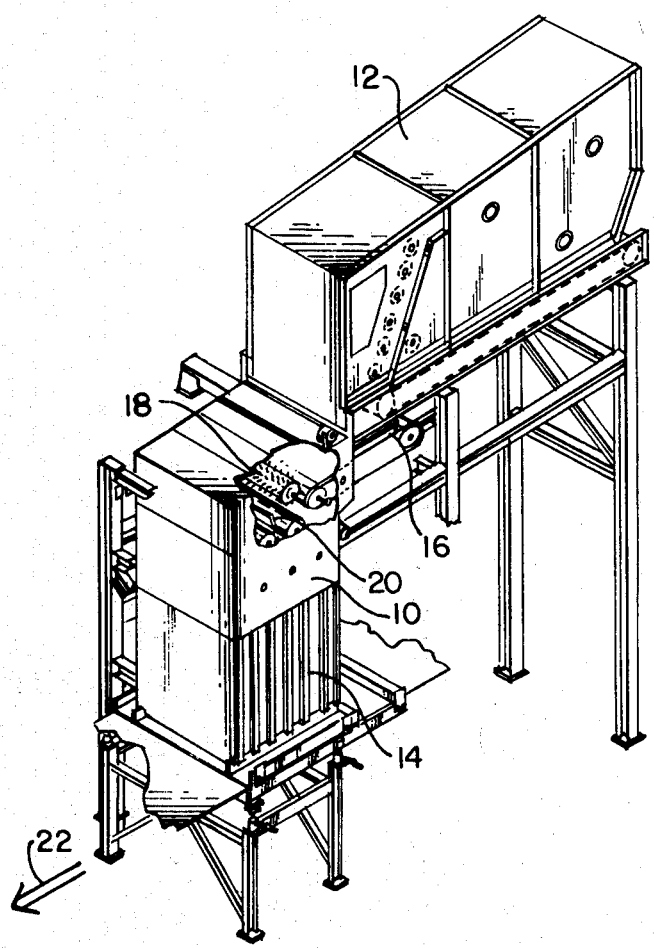
FIG. 1 is an isometric view of a system utilizing the distribution apparatus and method according to the invention.

FIG. 1 shows a distribution apparatus 10 for uniformly distributing freely-falling wood particles. The wood, preferably in the form of non-fibrous particles, is delivered from a source 12 to the distribution apparatus 10 wherein the freely-falling particulate material is distributed within the orientation zone of electrostatic orientation equipment 14, in which a strong electrical field polarizes each particle for alignment within the field. The aligned particles form a mat which is subsequently processed into a composite panel product. Material from the storage bins of the source 12 is metered onto a conveyor belt 16 at a predetermined rate for a particular product density, thickness and production-line speed. The off-feed end of the conveyor 16 is adjustably positioned to drop freely-falling material at a predetermined point. A spiked roll 18 positioned above the off-feed end of the conveyor 16 peels excess material from the conveyor to prevent clumps of material interwoven with the belt of the conveyor 16 from causing surges of material flow, particularly when long flakes and strands of particulate material are processed. An adjustable flap 20 (see FIG. 6) is mounted adjacent the end of the conveyor 16 to direct the flow of material from the conveyor. The conveyor 16, the spiked roll 18, and the adjustable flap 20 distribute a flow of particulate material at a constant rate to the distribution apparatus 10.

Figure 2:
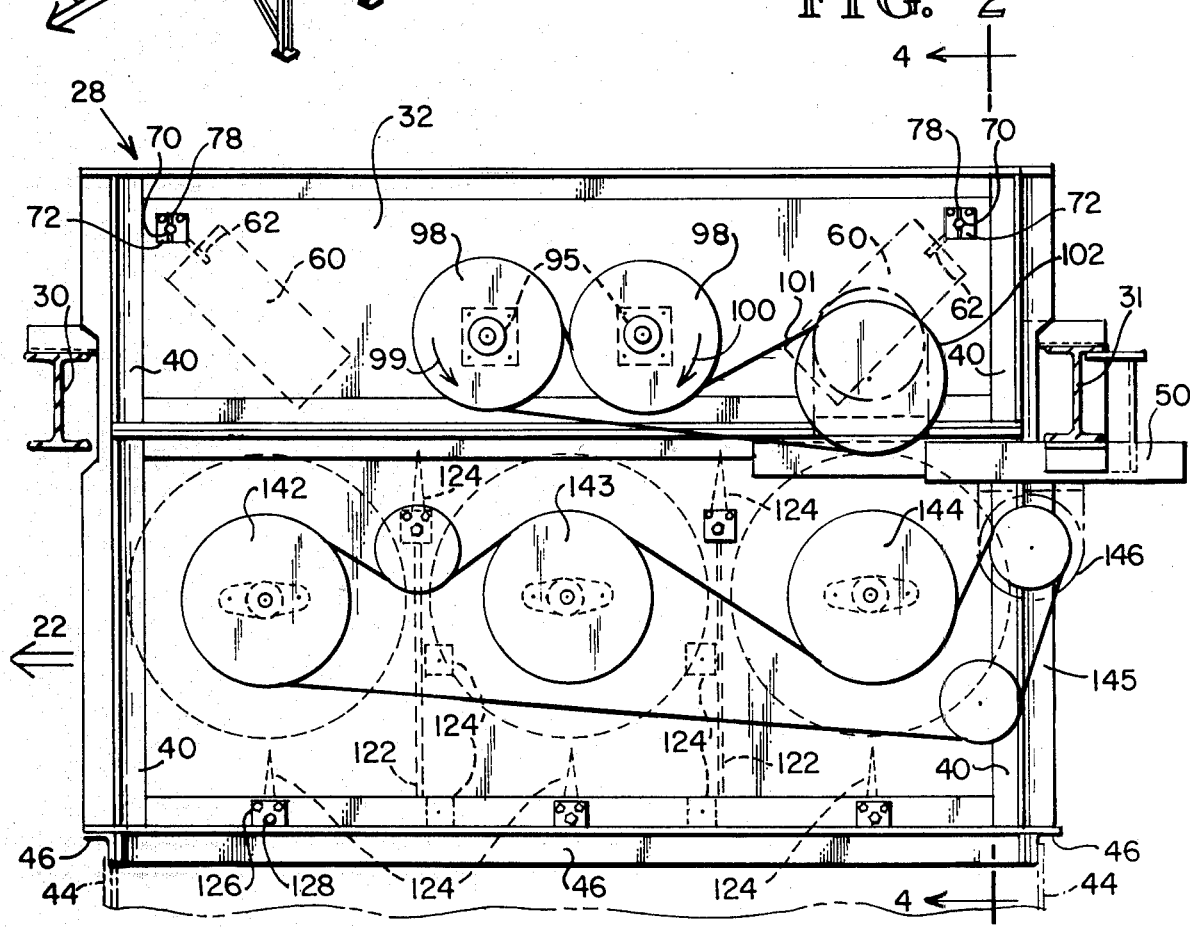
FIG. 2 is a side elevation view of the distribution apparatus.
Figure 3:
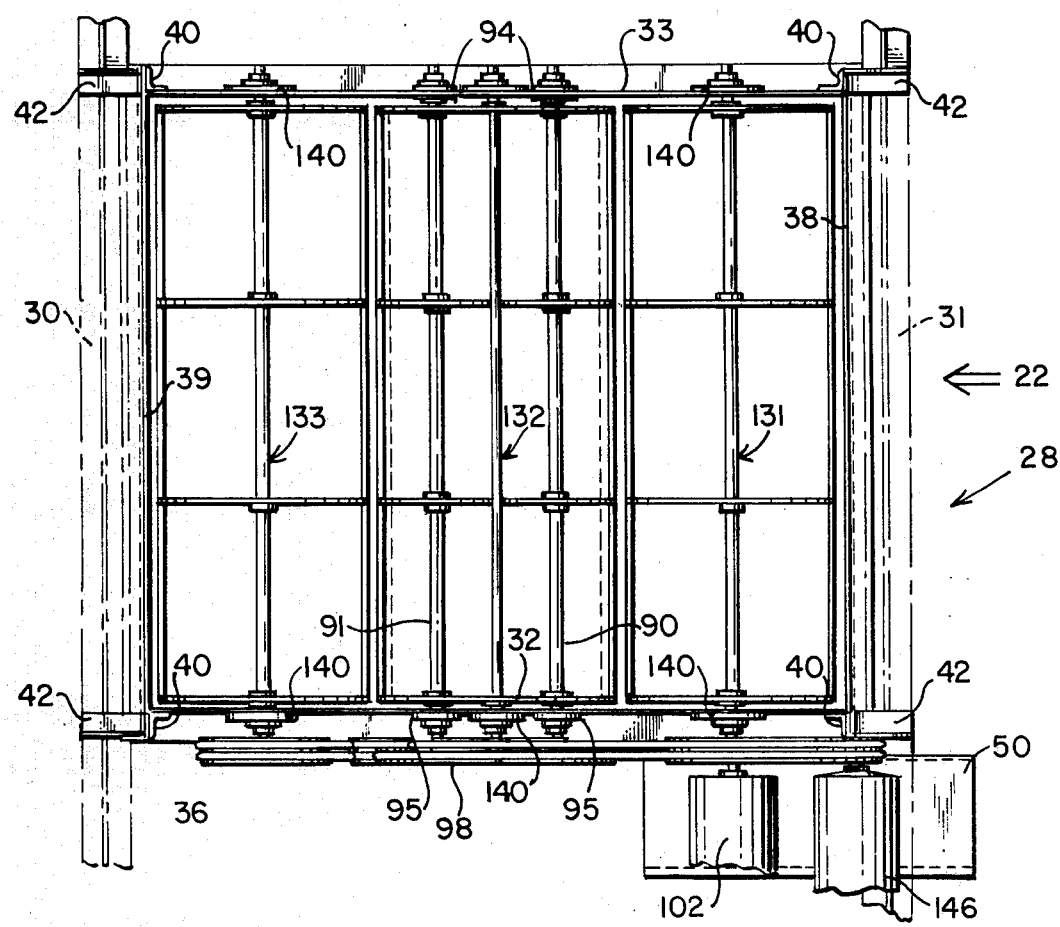
FIG. 3 is a sectional plan view of a distribution apparatus taken along section line 3—3 of FIG. 2.
Figure 4:
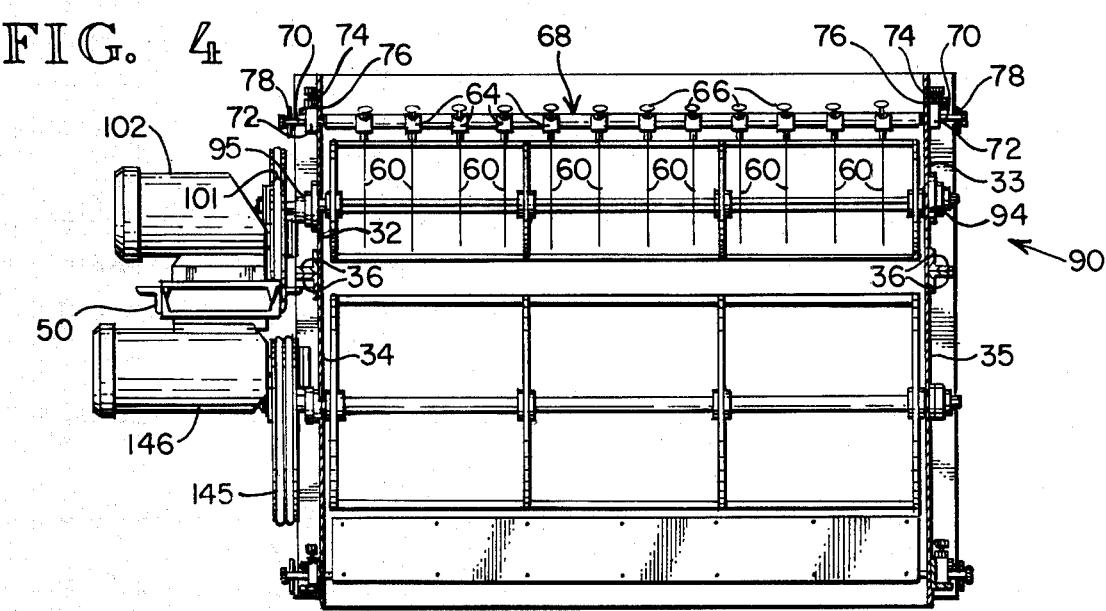
FIG. 4 is a sectional elevation view taken along section line 4—4 of FIG. 2.

The distribution apparatus is shown in greater detail in FIGS. 2, 3 and 4. A housing 28 supported on I-beam members 30, 31, which are part of a support structure for the installation, is formed as a rectangular enclosure having an open top and bottom. The arrow 22 in FIG. 3 indicates the direction of movement of the particle mat with respect to the housing. The housing has sides lying generally parallel to the direction of the mat flow on opposite sides of the mat. FIG. 4 shows in cross-section that each side is formed from a top side panel 32, 33 and bottom side panels 34, 35, which are respectively joined together with right angle sections 36 extending horizontally across the apparatus. End panels 38, 39 are joined to the side panel portions of the housing using a plurality of right angle brackets 40, as shown in FIGS. 2 and 3. I-beams 30, 31 from the support structure for the apparatus are fixed to support brackets 42 attached to the end corners of the housing 28. As shown in FIG. 2, the lower edges of the housing 28 are connected to a sliding skirt box having slide connector plates 44 to provide a telescoping joint for connection to an electrostatic orientation unit. The sliding skirt box allows the orientation cell to be adjusted vertically.

FIGS. 2 and 4 show a plurality of guide vanes 60, shown in FIG. 2 as rectangular plates, having studs 62 on one end, which studs are each threaded into portions of one of a plurality of baffle collars 64. The baffle collars are locked by set screws 66 threaded into the baffle collars 64. The baffle collars 64 are spaced apart on a baffle shaft 68 extending through apertures in each of the baffle collars 64 and also extending between the sidewalls 32, 33 of the housing. The baffle shaft 68 has deflector shafts 70 coaxially attached to each end and extending through a horizontal aperture in a respective shaft lock block member 72. Another aperture extending through the shaft lock block member intersects the aperture through which the shaft 70 extends, has a lock bolt 74 threaded therethrough, and is held in position by lock nuts 76. Small rods 78 extend through apertures in the deflector shafts 70 to provide visual indications of the position of the vanes 60 within the housing. The vanes 60 are adjustably positioned on the baffle shaft 68 by moving the baffle collars 64 longitudinally and radially on the baffle shaft 68. The vanes 60 are also rotatable about the axis of their studs 62.

FIGS. 3 and 4 show a pair of contrarotating squirrel-cage top rolls 90, 91 extending between and mounted to the top sidewalls 32, 33 on flange bearings 94, 95. The axles of the contrarotating squirrel-cage top rolls 90, 91 are coupled to sheaves 98 which are driven in the directions indicated by the arrows 99, 100, shown in FIG. 2, by a double V-belt 101 driven by a motor 102 mounted to the motor mount 50.

Figure 5:
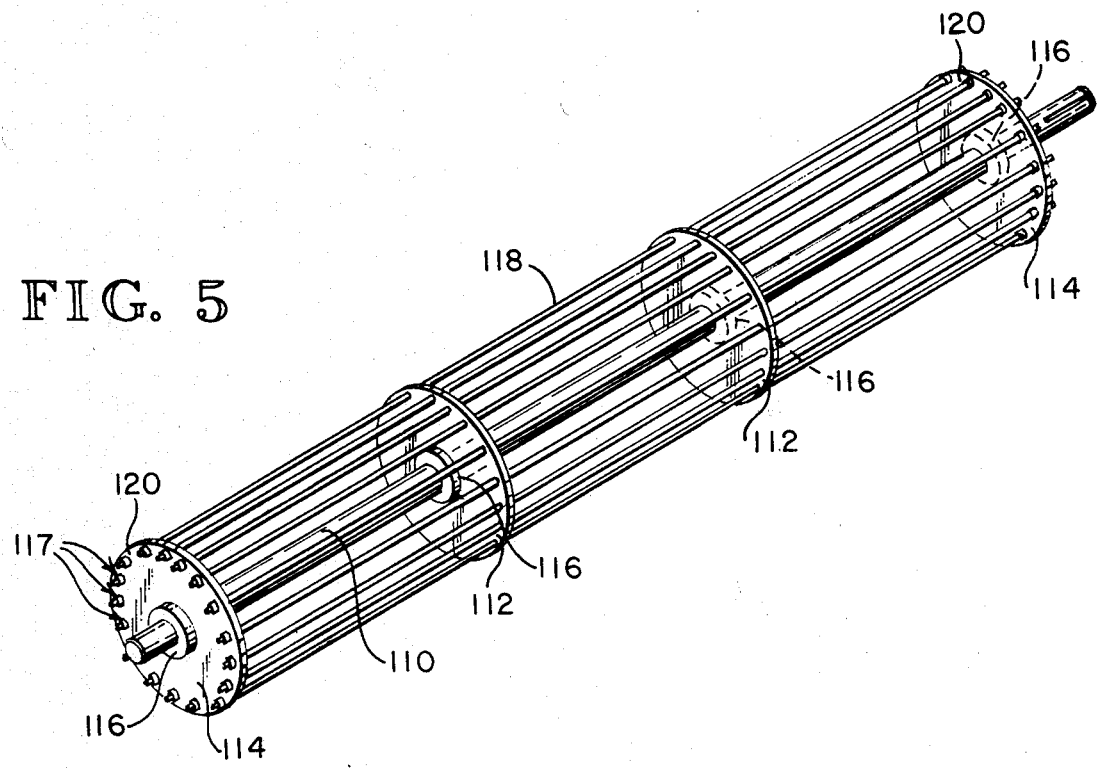
FIG. 5 is an isometric view of a squirrel-cage roller used in the distribution apparatus.

FIG. 5 shows a typical squirrel-cage roll construction. Each roll includes a central axle 110 formed of bar stock. A plurality of circular steel plates serve as intermediate support plates 112 and end plates 114. Each of the plates has a steel collar 116 which is welded to the center of each of the plates and which forms a hub through which extends the central axle 110. Each of the plates is fixed in position along the axle 110 by a set screw extending through a threaded aperture formed in each of the collars 116. A plurality of evenly spaced holes 117 are formed near the peripheral edges of each of the circular plates 112, 114. For the contrarotating top rolls, the plates 112, 114 have a ten-inch diameter and have sixteen spaced-apart holes formed therein. A plurality of quarter-inch rods 118, which are threaded at each end, pass through a hole 117 in each of the plates and are engaged at each threaded end by one of a plurality of nuts 120. The number of rods 118 on a roll can be varied as required for distributing different types of particulate materials.

The speed of the motor 102 is adjustable to rotate the squirrel-cage top rolls 90, 91 to a maximum of 400 rpm, with between 100 and 200 rpm as a normal setting, depending upon the type of particles being distributed. The contrarotating rolls 90, 91 are adjustably mounted so that their parallel axes may be moved apart such that the rolls 90, 91 are spaced as much as two inches apart, with three-eighths of an inch being a normal spacing. Material from the end of the conveyor 16 falls toward the rolls such that about one-third of the material flow passes between the two rolls. Another third is deflected by the roll 90 towards one end of the apparatus and the other third of flow is deflected by the other roll 91 towards the other end. Thus, three substantially equal portions of flow are produced by the contrarotating rolls 90, 91. The rolls 90, 91 are rotating sufficiently fast and the bars 118 are spaced sufficiently close such that a proportion of the particles passes through the squirrel cages. The vanes 60 are adjusted to laterally distribute the flow of material transverse to the direction of movement of the mat. These vanes deflect material which in turn has been deflected by the contrarotating rolls 90, 91 sidewise in directions perpendicular to their longitudinal axes of rotation.

The lower portion of the housing is divided into three substantially equal chambers by a pair of plates 122 which are mounted in position between the lower sidewalls 34, 35. Mounted near the top edge of each of the divider plates 122 are respective adjustable deflector plates 124. Similar deflector plates 124 are also mounted to laterally traverse and divide the lower outlet portion of the distribution chambers formed by the divider plates 122. Each deflector plate 124 is adjustably mounted at each end to a shaft lock block 126, which engages a shaft 128 mounted to an end corner of a deflector plate 124.

The substantially equal one-third portions of the particle flow from the first set of contrarotating squirrel-cage rolls 90, 91 are respectively directed to one of the chambers formed by the divider plates 122. Each chamber has a respective larger-diametered, second set of squirrel-cage distribution rolls rotatably mounted therein. Each of the distribution rolls 131, 132, 133 is formed substantially like one of the contrarotating squirrel-cage rolls 90, 91 described hereinabove. In this case, however, the diameter of the steel plates is eighteen inches, and thirty-six removable rods extend through a corresponding number of holes formed near the peripheral edge of each of the plates. Each of the distribution squirrel-cage rollers 131, 132, 133 is shown in FIG. 3 mounted to the lower sidewalls 34, 35 on flanged bearings 140, and each is driven by sheaves 142, 143, 144 by a double V-belt 145 from a motor 146 mounted to the motor mount plate 50. The motor 146 operates the distribution rolls 131, 132, 133 at a normal speed of 75 rpm, variable between 25 rpm and 150 rpm. Almost all of the particles delivered to each of the distribution chambers formed in the lower portion of the housing 28 pass through the squirrel cages of the distributor rolls 131, 132, 133 for even distribution within the six areas formed between the lower edges of the divider plates 122 and the deflector plates 124, as shown in FIG. 2.

Figure 6:
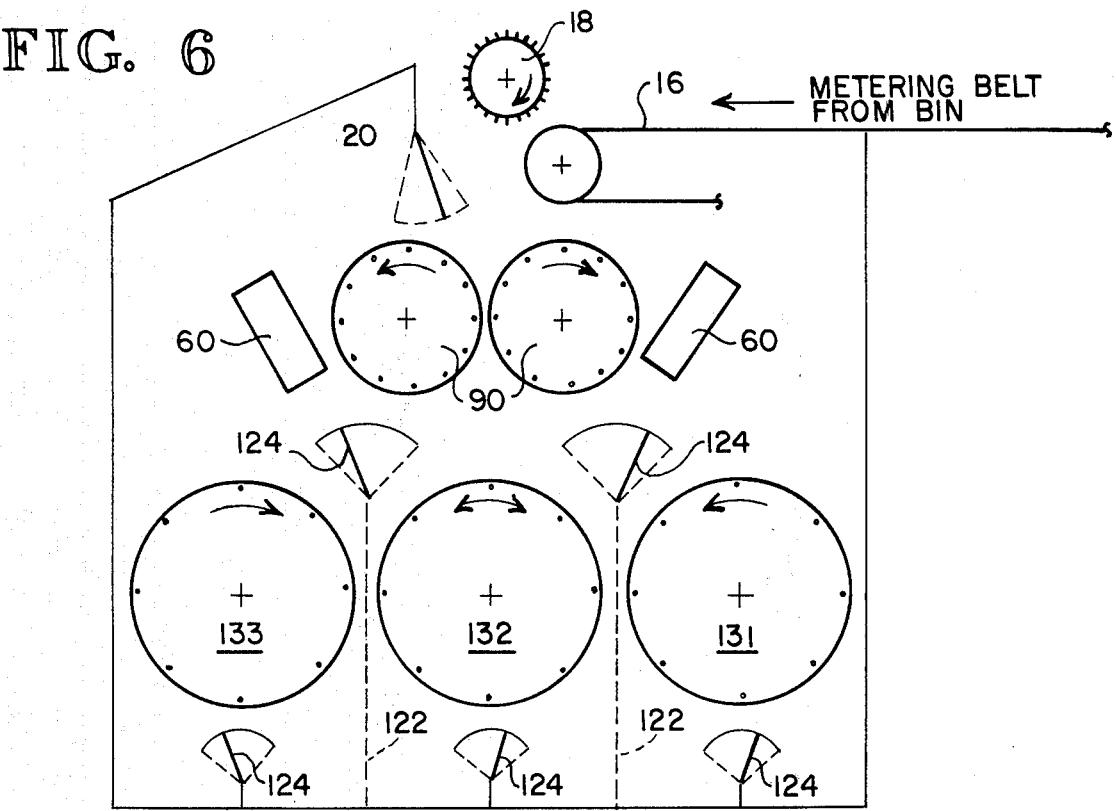
FIG. 6 is a schematic representation of the distribution apparatus according to the invention.

FIG. 6 is a schematic representation of the machine showing apparatus for implementing the method of uniformly distributing freely-falling particulate material over an area. The take-off end of the conveyor belt 16 is adjustable such that the particulate material freely falls to engage the contrarotating rollers 90, 91. The spiked roll 18 prevents surges of material by removing material which has become interwoven with the belt portion of the conveyor 16. The adjustable flap 20 directs the material from the end of the conveyor 16 to the contrarotating rolls 90, 91. Approximately one-third of the material flows through the space between the rolls 90, 91, and the other two-thirds of the flow is evenly divided by deflection from the rolls 90, 91. The vanes 60 are adjustable to laterally distribute the material to the end distribution rolls 131, 133. Each portion of the particulate material flows is directed to one of the three chambers formed on the lower portion of the housing by the divider plates 122, where the larger-diametered, squirrel-cage section rolls 131, 132, 133 evenly distribute the material by having the material pass through the squirrel-cage configuration of each. Further distribution of the material may be obtained by the adjustable deflector plates 124. The apparatus evenly and uniformly distributes the particles over the area beneath the distribution apparatus, typically the inlet area of an electrostatic orientation cell.

While particular embodiments of the invention have been shown and described, it should be understood that the invention is not limited thereto since many modifications may be made. It is therefore contemplated to cover by the present application any and all such modifications that fall within the true spirit and scope of the invention claimed herein.

We claim:

1. Apparatus for receiving a metered flow of discrete particles of lignocellulosic material and uniformly distributing the particles uniformly over a predetermined area as they are allowed to free-fall by gravity through the distribution apparatus, comprising:
    a pair of spaced-apart, contrarotating squirrel-cage rolls, each mounted for rotation about their respective longitudinal axes in a direction opposite to the direction of flow of the discrete particles of lignocellulosic material therethrough, the pair of rolls positioned to receive the flow of freely falling particles so that a first portion of the flow passes between the spaced-apart rolls while second and third portions of the flow are directed outwardly from the first portion of the flow by the contrarotating rolls;
    multiple chambers positioned beneath the contrarotating, squirrel-cage rolls for receiving the particles of the first, second and third portions of the flow;
    a plurality of individually adjustable guide vanes positioned in the flow of the second and third portions for adjusting the distribution of the second and third portions of the flow laterally of the direction of flow of the portions; and
    a plurality of rotating squirrel-cage distribution rolls, one mounted within each of the multiple chambers, each distribution roll positioned with its respective longitudinal axis substantially parallel to the longitudinal axes of the contrarotating, squirrel-cage rolls for evenly distributing the respective first, second and third portions of the flow passing therethrough.

2. The apparatus of claim 1 wherein the multiple chambers include three chambers, with a squirrel-cage distribution roll mounted in each chamber.

3. The apparatus of claim 2, including adjustable deflector means between the contrarotating rolls and the plurality of distribution rolls for directing flow of the discrete particles to the three chambers.

4. The apparatus of claim 2, including adjustable deflector means beneath each of the distribution rolls for directing the outflow of the particles from the distribution rolls.

5. The apparatus of claim 1, including conveyor means and deflector means above the contrarotating rolls for directing the metered flow of the discrete particles between the contrarotating squirrel-cage rolls.

6. A distribution apparatus for evenly and uniformly distributing discrete particles of lignocellulosic material over the inlet area of an electrostatic orientation cell as they are allowed to fall through the distribution apparatus by gravity, comprising:
    an electrostatic orientation cell having an inlet area;
    a plurality of chambers of greater width than length relative to the direction of in-flow of the discrete particles, each chamber having a material inlet area and a material discharge area and positioned with its discharge area over the inlet area of the electrostatic orientation cell;
    means for delivering substantially equal portions of a flow of lignocellulosic particles to each of the chambers and across the width dimension of each of the chambers; and
    a plurality of squirrel-cage distribution rolls mounted for rotation within each of the respective chambers with their longitudinal axes parallel to the width dimension of the chambers and extending the width of the chamber, each squirrel-cage distribution roll evenly distributing the discrete particles falling therethrough by gravity over the discharge area of that respective chamber.

7. The apparatus of claim 6 wherein there are three contiguous with a squirrel-cage distribution roll located in each chamber, and wherein the means for delivering portions of a flow of discrete particles to each of the chambers includes a pair of spaced-apart, contrarotating squirrel-cage rolls positioned above the three chambers and mounted with their respective longitudinal axes parallel to the longitudinal axes of the squirrel-cage distribution rolls such that one portion of the flow of discrete particles passes between the contrarotating, squirrel-cage rolls to the center one of the three squirrel-cage distribution rolls and such that the second and third portions of the flow of discrete particles are directed outwardly from the first portion of the flow for passage through the contrarotating rolls and the squirrel-cage distribution rolls positioned on each side of the center squirrel-cage distribution roll.

8. The apparatus of claim 7, including a conveyor for conveying a mat of discrete particles having a width substantially equal to the width of the respective chambers above the pair of contrarotating rolls for discharge between the contrarotating rolls, and means positioned above the off-feed end of the conveyor for peeling excess amounts of discrete particles from the conveyor to prevent clumps of particles from passing between the contrarotating rolls.

9. The apparatus of claim 7, including adjustable deflector means extending the width dimension of the respective chambers and positioned between and substantially parallel to the longitudinal axes of the contrarotating rolls and plurality of distribution rolls for directing flow of the discrete particles passing through the contrarotating rolls to the chambers.

10. The apparatus of claim 7, including adjustable deflector means beneath each of the distribution rolls extending the width of the respective chambers and positioned substantially parallel to the longitudinal axes of each of the squirrel-cage bottom distribution rolls for directing the outflow of the particles passing through the respective squirrel-cage bottom distribution rolls.

11. A method of uniformly distributing particles of lignocellulosic material delivered to a distribution apparatus as a mat of discrete particles for distribution by gravity flow of the particles through the distribution apparatus to the inlet area of an electrostatic orientation cell, comprising:
    breaking up a mat of discrete lignocellulosic particles,
    allowing the particles to flow between a pair of spaced-apart, contrarotating rolls rotating in a direction opposite to the direction of flow of the discrete particles therethrough, a first portion passing between the spaced-apart, contrarotating rolls, and second and third portions deflected from the first portion by the contrarotating rolls into second and third portions which pass through the respective contrarotating rolls;
    allowing the three portions to pass into respective distribution chambers positioned beneath the contrarotating, squirrel-cage rolls, each of the distribution chambers including therein a squirrel-cage distribution roll; and
    evenly distributing the flow of particles passing through the respective distribution chambers with the respective squirrel-cage distribution rolls over the discharge area of the respective chamber.

* * * * *